Dec. 30, 1952  S. O. MORRISON  2,623,367
WATER COOLER AND FILTER
Filed Jan. 6, 1950  3 Sheets-Sheet 1
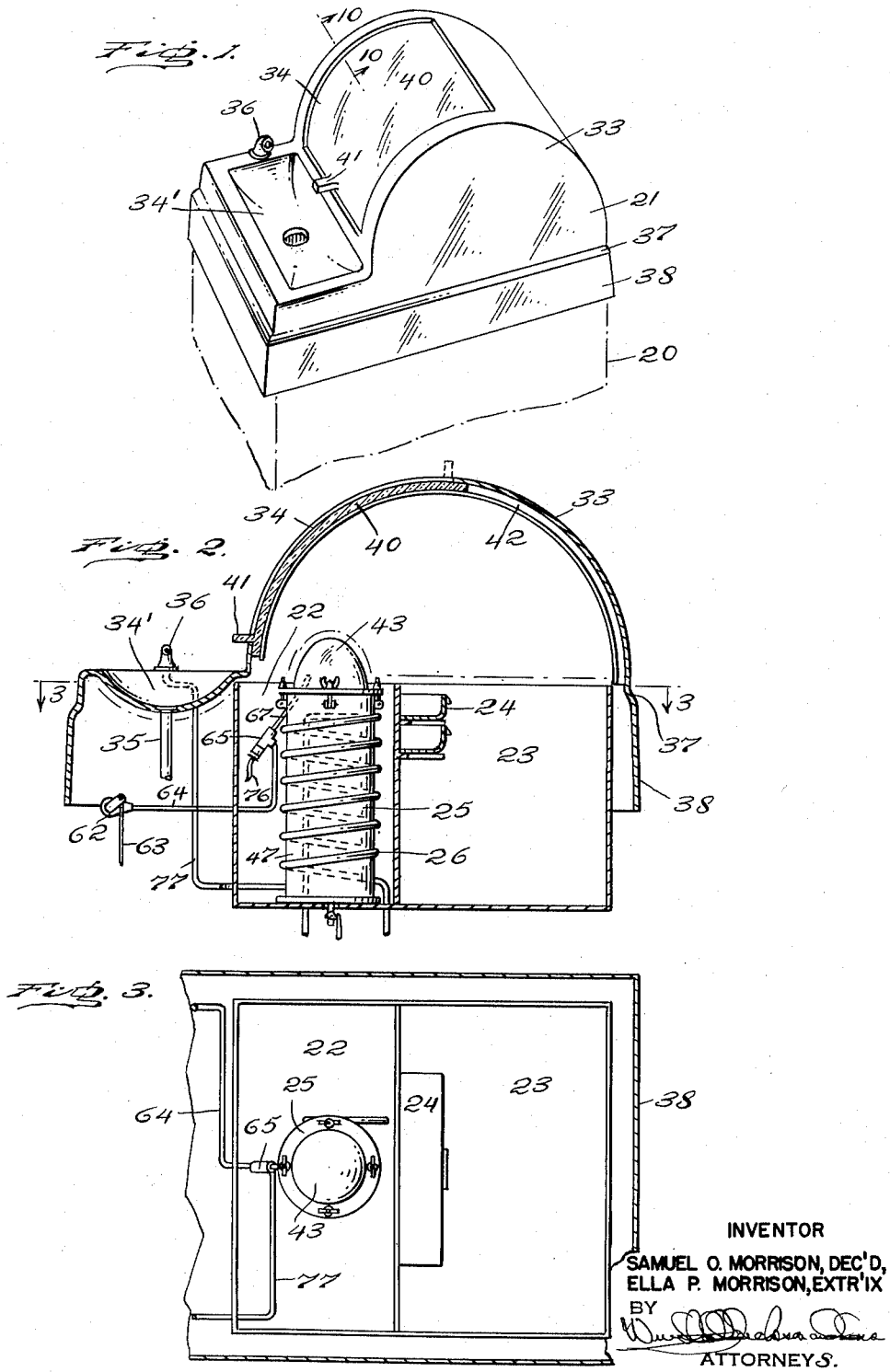
INVENTOR
SAMUEL O. MORRISON, DEC'D,
ELLA P. MORRISON, EXTR'IX
BY
ATTORNEYS.

Dec. 30, 1952     S. O. MORRISON     2,623,367
WATER COOLER AND FILTER
Filed Jan. 6, 1950     3 Sheets-Sheet 2
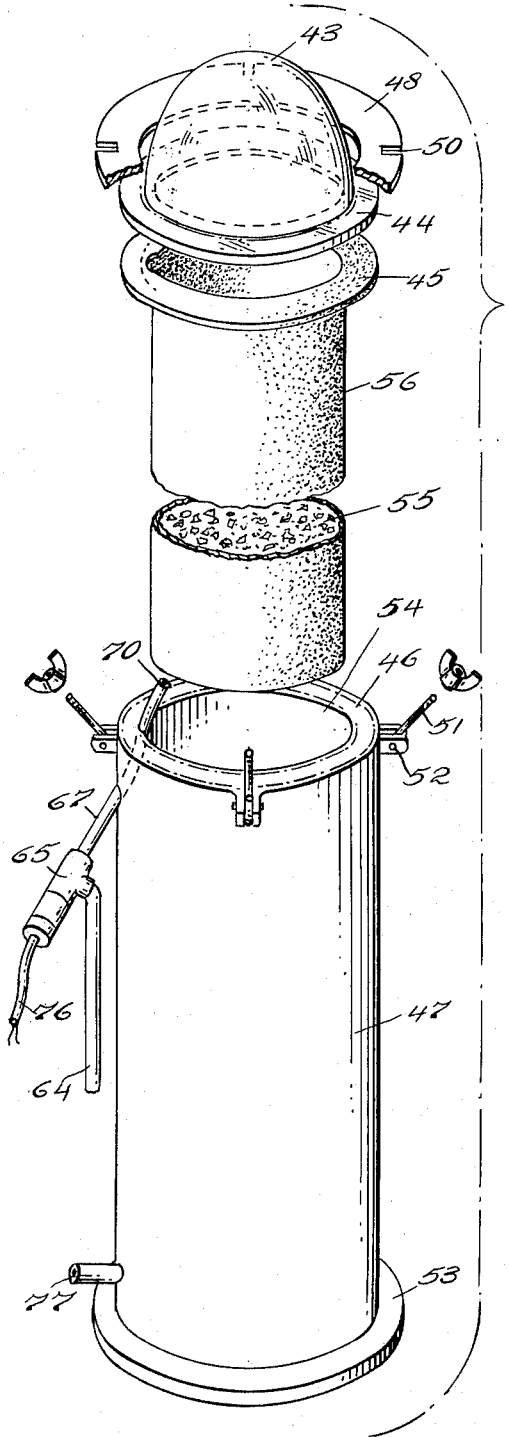
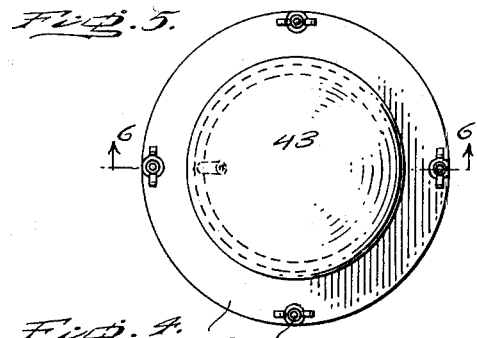
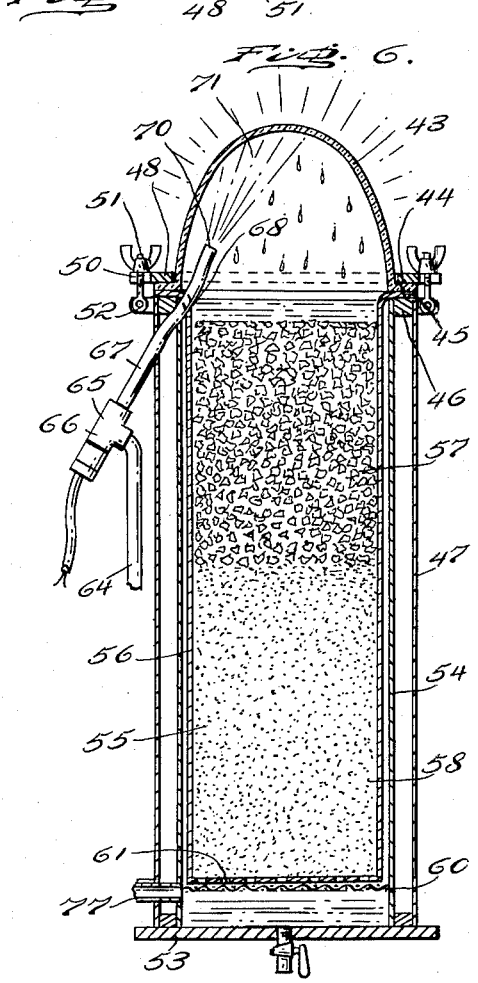
INVENTOR
SAMUEL O. MORRISON, DECEASED,
ELLA P. MORRISON, EXECUTRIX
ATTORNEYS.

Dec. 30, 1952     S. O. MORRISON     2,623,367
WATER COOLER AND FILTER

Filed Jan. 6, 1950     3 Sheets-Sheet 3

INVENTOR
SAMUEL O. MORRISON, DECEASED,
ELLA P. MORRISON, EXECUTRIX

ATTORNEYS.

Patented Dec. 30, 1952

2,623,367

UNITED STATES PATENT OFFICE 2,623,367

WATER COOLER AND FILTER

Samuel O. Morrison, deceased, late of Pine Ridge, Pa., by Ella P. Morrison, executrix, Pine Ridge, Media, Pa., assignor to Sunroc Refrigeration Company, Dover, Del., a corporation of Delaware Application January 6, 1950, Serial No. 137,064

6 Claims. (Cl. 62—141)

The present invention relates to water coolers and filters of the type employed in cooling, purifying and dispensing drinking water.

A purpose of the invention is to improve the purity of drinking water and to increase the pleasure derived by the user in drinking from a drinking fountain or water cooler.

A further purpose is to project illumination into a stream of drinking water being cooled, employing either visible illumination or germicidal radiation or both, and preferably to make the visible illumination of the stream apparent to the user.

A further purpose is to illuminate a spray of water entering a heat transfer unit of a water cooler, preferably a filter, and to make the spray visible through a transparent dome or head on the heat transfer unit.

A further purpose is to provide a cylindrical shell on the water cooler top above the heat transfer unit, and to place a transparent lid in the shell, opening the lid to permit change of a cartridge in the filter and also to permit access to a food compartment desirably behind the filter.

A further purpose is to support the filter cartridge in a plastic bag which preferably is integral with the gasket of the filter.

Further purposes appear in the specification and in the claims.

The drawings have been chosen to illustrate one only of the numerous embodiments in which the invention may appear, selecting the form shown from the standpoints of convenience in illustration, satisfactory operation and clear demonstration of the principles involved.

Figure 1 is a fragmentary perspective of the upper portion of a water cooler embodying the principles of the invention.

Figure 2 is a vertical central longitudinal section of the upper portion of the water cooler of Figure 1.

Figure 3 is a fragmentary section of Figure 2 on the line 3—3.

Figure 4 is a fragmentary exploded perspective of the filter heat transfer unit without the refrigerant coil.

Figure 5 is a top plan view of the heat transfer filter of Figure 4.

Figure 6 is a section of Figure 5 on the line 6—6.

Figure 7:
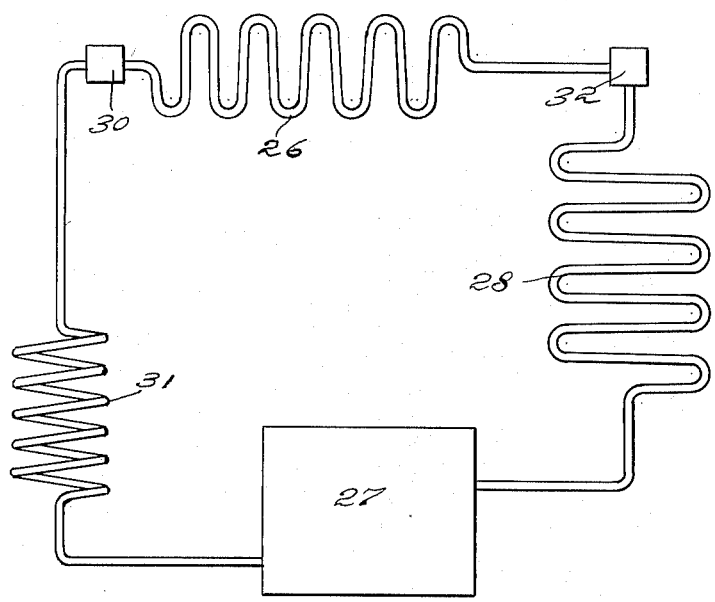
Figure 7 is a diagrammatic refrigerant pipe arrangement.
Figure 8:
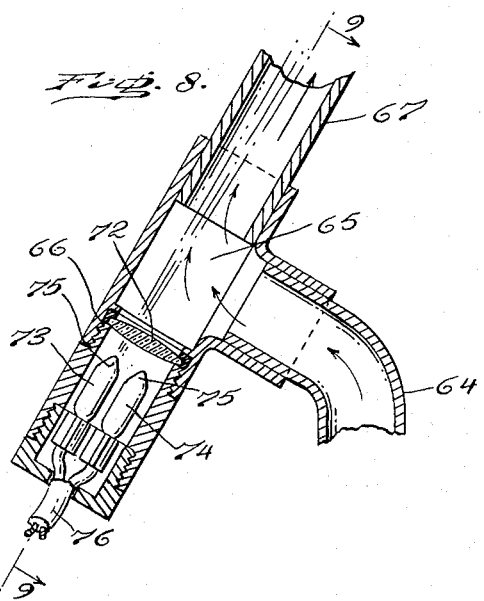
Figure 8 is an enlarged central longitudinal section of the illuminator shown in Figures 2, 3, 4 and 6.

Describing in illustration but not in limitation and referring to the drawings:

The present invention is concerned with increase in the safety, palatability and appearance of the water dispensed by a drinking fountain to the user. In the prior art many drinking fountains dispensing safe drinking water have not appealed to the public because of the comparatively dark and unattractive appearance of the water provided. In accordance with the present invention the water is preferably subjected to filtering and exposure to germicidal radiation and also is rendered more attractive by illumination of a spray of water visible to the user. This spray is desirably provided at the point of inlet to the water filter which functions as a cooling or heat transfer unit, so that the user will not only see the spray but see the filtering taking place in the preferred embodiment.

The illumination of the water will desirably increase the eye appeal of the drink, and will also create a very attractive effect visible to the user, such as a sun or spot of light on the transparent dome of the filter. This feature, in combination with suitable marking or illustration on or adjacent the dome may also be used for trade-mark purposes.

As previously explained in the copending application of Samuel O. Morrison, Serial No. 650,437, filed February 27, 1946 for Filter and Temperature Control, which has now matured into Patent No. 2,581,125, granted January 1, 1952, there is reduced opportunity for a filter to become contaminated by bacteria if the filter is maintained at reduced temperature. Accordingly, by filtering in the actual heat transfer unit, the chance of the contamination of the filter is minimized.

The filter employed is preferably of the type which has a removable cartridge replaced through the head or dome of the filter. For replacement purposes, the top of the water cooler desirably includes a removable lid directly above the filter, which permits access to the filter to replace the cartridge, and also preferably permits access to a food compartment of the refrigerator.

The filter cartridge is preferably contained in a plastic bag, which is desirably integrally joined with the gasket and the filter.

For illumination purposes, the inlet water is led through an L, and the lamp or lamps are preferably applied to the base of the L in the direction of the incoming stream.

The water cooler of the invention comprises a cabinet 20 of any suitable character having a top 21 and provided internally with a filter compartment 22 suitably toward the front of the cabinet and a separate food compartment 23 preferably toward the back, having ice cube trays 24 as well known. The filter compartment is occupied by a filter-heat transfer unit 25 which is surrounded by an evaporator coil 26 (Figure 2) suitably in contact with the casing of the filter. The evaporator coil 26 receives refrigerant from a mechanical refrigerating system including a motor compressor 27, (Figure 7), a condenser 28, a second series constrictor 30, an ice cube evaporator 31 and a first series constrictor 32. Return ice cube evaporator coil 31 is to the suction side of the compressor. The use of the constrictors in series is covered by John G. Wehrwein U. S. application Serial No. 41,022, filed July 28, 1948 for Refrigerator and Water Cooler, which has become abandoned.

The top is desirably formed of plastic or metal and comprises a semi-cylindrical drum-shaped upstanding portion 33 having a cutout window 34 at the front, and closed at the back and ends. In the front of the window and below the drum-like portion, desirably integral with the top, is a catch basin 34' having a drain 35 for receiving surplus drinking water from a bubbler or other dispenser 36 mounted at one side of the catch basin. The top is shouldered around the circumference at 37 and is provided with downwardly extending flanges 38 which engage around the side walls of the cabinet.

Figure 10:
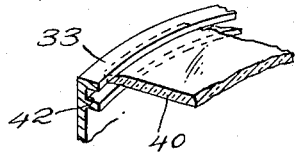
Figure 10 is a fragmentary section of Figure 1 on the line 10—10.
Figure 9:
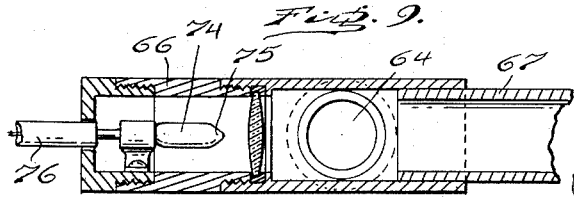
Figure 9 is a section of Figure 8 on the line 9—9.

The window 34 is closed by an arcuate lid 40 desirably of transparent plastic having a handle 41 and running in an arcuate track 42 best seen in Figures 2 and 10. When the lid is pushed up and back along the track the user can reach into the food compartment to place or remove food or to place or remove ice cube trays and can also gain access to the filter 25, as for example to replace a cartridge. During normal use when the lid 40 is closed, the user can see the filter and the water in the filter through a transparent, generally semi-spherical dome 43 on the filter, suitably made of glass or acrylic or urea-formaldehyde plastic. The dome 43 has a base flange 44 which engages against a gasket 45, suitably of elastomer plastic such as polyethylene, or polyvinyl chloride which extends around an annular gasket shoulder 46 on the upper end of a suitably metallic tubular casing 47 of the filter. The dome is pulled down on the gasket by a tightening ring 48 above the flange of the dome, having recesses 50 into which extend hold-down bolts 51 pivotally connected at 52 to the casing.

The casing is closed at the bottom by a head 53, preferably of metal, suitably attached to the casing as by welding. A casing liner 54, suitably a tube of stainless steel or the like, extends from the bottom head to the inside edge of the top of the gasket shoulder 46.

A filter cartrige 55, consisting of a pliable bag 56, suitably of an elastomer such as polyethylene or polyvinyl chloride, containing a suitable filter material such as activated carbon 57 and sand 58, occupies the space inside the liner 54 and desirably rests at the bottom on a screen 60. The bottom of the bag is perforated at 61.

The bag is preferably integral with the gasket 45, the two being joined as by heat sealing.

Inlet to the filter and heat transfer unit from a source of water under pressure, such as the domestic water system, is provided through an inlet valve 62 (Figure 2) controlled in any suitable manner as by a foot pedal rod 63. The inlet water flows through a pipe 64, which enters at the side of a T 65 of an illuminator 66 and flows out through a pipe 67 connected to one branch of the T and extending toward the filter. The pipe 67 passes through the casing 47 and the liner 54 of the filter, being suitably sealed as by welding into the wall of the casing. It also passes through an opening 68 in the bag of the filter cartridge, the wells of the opening desirably hugging pipe 67 to provide good sealing due to the elasticity of the elastomer of the bag.

As best seen in Figures 4 and 6, the inlet pipe 67 terminates at 70 in a spray nozzle, discharging a spray 71 on the inside upper edge of the transparent dome 43. Illuminator 66 is provided with a window 72 preferably of lens character and preferably of quartz in the opposite branch of the T from the inlet pipe 67. On the side of the window remote from the water, one or preferably two electric illuminators 73 and 74 are provided, desirably of the type having lens-like forward ends 75, which focus the illumination into a beam. The illuminators may be entirely of one wave length, but it is preferable to employ a plurality of wave lengths. In the illustration shown, the lamp 73 produces light in the luminous range, which may if desired be white light or may preferably in many cases be light of a special visible color such as red, green or yellow light to produce an attractive spot or sun effect on the inside of the transparent dome 43 where the spray strikes against the dome. The other electric lamp 74 is in the case shown a lamp operating on a wave length of 1000 to 2950 Angstrom units, preferably 2200 to 2950 Angstrom units as well known, which will inhibit or destroy bacteria or other organisms. Such lamps are available on the market for sterilizing fluids such as air and the like.

It will be evident that the beams of light are projected longitudinally into the stream of water flowing into the top of the filter, and will bend with the stream of water as it follows gradual bends in the pipe according to the well known phenomenon of total reflection in a medium.

Electrical connections to the respective lamps are shown at 76.

Water entering the filter at the top flows down through the filter, and at the same time is cooled by the refrigerant coil 26 surrounding the casing 47 (see Figure 2). The filtered water passes through the openings of the filter bag at the bottom and through the screen 60 into the space below the screen and then leaves the filter-heat exchanger by a pipe 77 which extends to the dispenser 36.

In operation it will be evident that the mechanical refrigeration unit produces liquified refrigerant such as Freon, which is cooled in the condenser and then expands partially through the first constrictor 32 into the evaporator 26 which surrounds the casing of the filter, after which it further expands through the second constrictor 30 into the ice cube and food compartment evaporator 31.

When the user opens the inlet water valve 62, drinking water passes through the pipe 64 and enters the side of the illuminator T 65, and the water is subjected to rays of luminous light and rays of ultraviolet radiation. To avoid cutting out the ultraviolet the window or lens 72 is desirably of quartz. The water carrying the rays of light enters the top of the filter as a stream, breaking up into small particles against the underside of the dome 43. At the point of impingement of the water against the dome a beautiful lighting effect is produced. At the same time the ultraviolet, although not visible to the user and not harmful to the user due to the elimination by the dome and the transparent lid, which preferably do not transmit ultraviolet, exerts a germicidal action on the water.

The water then passes through the filter and out the bottom to the bubbler where it is available to provide a cool drink for the user. The user can watch the filtering as he drinks.

At any time that it is desired to use the food compartment or the ice cube compartment, the lid 40 is raised and the user can reach into the food compartment.

When it is desired to change a filter cartridge the electric current is first cut off on the water cooler to avoid damage to the eyes of the serviceman by the ultraviolet light. The lid 40 is opened and the nuts on the bolts 51 are loosened, removing the pressure ring 48 and the dome 43. The bag and contents are then lifted out bodily through the window 34. The new cartridge is then inserted, placing it down inside the liner 54, slipping the inlet pipe 67 through the opening 68 in the bag and seating the gasket on the gasket shoulder 46. The dome and pressure ring are then replaced and the bolts are tightened. The device is then ready for use.

No attempt has been made to illustrate the heat insulation which normally will be employed around the refrigeration parts, it being understood of course that the usual precautions will be taken to insulate.

In view of the invention and disclosure variations and modifications to meet individual whim or particular need will doubtless become evident to others skilled in the art, to obtain all or part of the benefits of the invention without copying the structure shown. Therefore all is claimed insofar as it falls within the reasonable spirit and scope of the claims.

Having thus described the invention, what is claimed as new and desired to be secured by Letters Patent is:

1. In a water cooler, a water filter, mechanical refrigeration means for cooling the water filter, a transparent dome on the filter, an inlet pipe to the filter directing water in a spray against the inside of the dome and a germicidal lamp directed into the stream of inlet water as it enters the filter in the direction of flow.

2. In a water cooler, a water cooler top having a cylindrical housing provided with an opening at the top, a movable transparent lid for the housing, means for guiding the lid in an arcuate path to cover and uncover the opening, a water filter beneath the lid under the housing and having a removable top and a removable cartridge in the water filter adapted to be withdrawn vertically upward through the opening when the lid is open.

3. In a water cooler, a water cooler top having a cylindrical housing, a movable transparent lid for the housing, a water filter beneath the lid under the housing and having a removable transparent dome at the top, a water inlet connection to the filter beneath the dome and directing a spray of water on the underside of the dome, and a removable cartridge in the filter adapted to be withdrawn vertically through the space left by the lid when it is open.

4. In a water cooler, a cooler top having a catch basin and dispenser at the front and a cylindrical shell provided with a transparent movable lid at the rear, a filter beneath the lid having a removable transparent dome, an inlet connection to the filter directing a spray within the inside of the dome visible through the lid, an outlet connection from the filter to the dispenser and a mechanical refrigerator having a heat transfer unit in heat transfer relation with the filter.

5. In a water cooler, a cover having a catch basin and dispenser at the front and a cylindrical shell provided with a slidable transparent lid toward the rear, a filter beneath the lid having a removable transparent dome and having a removable cartridge, a water inlet connection to the filter beneath the dome having a T, an electric lamp directing light into the inlet water at the T, a water outlet connection from the filter to the dispenser and a mechanical refrigeration device having a heat transfer unit in heat transfer relation to the filter.

6. In a water cooler, a cabinet having a food compartment and a water filter compartment, a top on the cabinet having a movable lid above the filter compartment and providing access into the food compartment, a filter in the filter compartment having a removable head, mechanical refrigeration means for cooling the food compartment and the filter, a water dispenser and water connections to the filter and from the filter to the dispenser.

ELLA P. MORRISON,
*Executrix, Estate of Samuel O. Morrison, Deceased.*

REFERENCES CITED

The following references are of record in the file of this patent:

UNITED STATES PATENTS

| Number | Name | Date |
|---|---|---|
| 627,594 | Saunders | June 27, 1899 |
| 1,190,769 | Jurist | July 11, 1916 |
| 1,339,675 | Snelling | May 11, 1920 |
| 1,430,035 | Snelling | Sept. 26, 1922 |
| 1,551,572 | Kneuper | Sept. 1, 1925 |
| 1,780,687 | Smith | Nov. 4, 1930 |
| 1,842,313 | Chaney | Jan. 19, 1932 |
| 1,960,975 | Mulch | May 29, 1934 |
| 2,034,792 | Bergman | Mar. 24, 1936 |
| 2,047,470 | Hart | July 14, 1936 |
| 2,145,304 | Hill | Jan. 31, 1939 |
| 2,199,301 | Bonnefoy | Apr. 30, 1940 |
| 2,413,704 | Glatthar | Jan. 7, 1947 |
| 2,489,966 | Laure | Nov. 29, 1949 |

FOREIGN PATENTS

| Number | Country | Date |
|---|---|---|
| 22,897 | Great Britain | Nov. 6, 1902 |
| 323,834 | France | July 29, 1904 |